(12) United States Patent
De Beer et al.

(10) Patent No.: US 9,791,086 B2
(45) Date of Patent: Oct. 17, 2017

(54) AT LEAST PARTIALLY HEATABLE LINE-CONNECTOR FOR A HEATABLE MEDIA LINE, AND AN ASSEMBLED MEDIA LINE COMPRISING SUCH A LINE-CONNECTOR

(71) Applicant: VOSS AUTOMOTIVE GMBH, Wipperfürth (DE)

(72) Inventors: Daniel De Beer, Engelskirchen (DE); Reinhard Plietsch, Wermelskirchen (DE); Günter Sieper, Remscheid (DE); Otfried Schwarzkopf, Kürten (DE)

(73) Assignee: VOSS AUTOMOTIVE GMBH, Wipperfurth (DE)

( * ) Notice: Subject to any disclaimer, the term of this patent is extended or adjusted under 35 U.S.C. 154(b) by 293 days.

(21) Appl. No.: 14/351,185

(22) PCT Filed: Oct. 11, 2012

(86) PCT No.: PCT/EP2012/004261
§ 371 (c)(1),
(2) Date: Apr. 11, 2014

(87) PCT Pub. No.: WO2013/053478
PCT Pub. Date: Apr. 18, 2013

(65) Prior Publication Data
US 2014/0230941 A1 Aug. 21, 2014

(30) Foreign Application Priority Data

Oct. 14, 2011 (DE) .......................... 10 2011 115 890
Oct. 14, 2011 (DE) .................... 20 2011 106 751 U

(51) Int. Cl.
*E03B 7/10* (2006.01)
*F16L 53/00* (2006.01)

(52) U.S. Cl.
CPC ........ *F16L 53/008* (2013.01); *F01N 2610/02* (2013.01); *F01N 2610/10* (2013.01); *F01N 2610/14* (2013.01); *F01N 2610/1486* (2013.01)

(58) Field of Classification Search
CPC .................................................. F16L 53/008
(Continued)

(56) References Cited

U.S. PATENT DOCUMENTS 4,815,769 A * 3/1989 Hopperdietzel .......... B05B 1/24
138/33
2007/0176418 A1* 8/2007 Frogneborn ............. H05B 3/58
138/103

(Continued)

FOREIGN PATENT DOCUMENTS

CN 101606014 A 12/2009
DE 10 2006 060 314 A1 6/2008
(Continued)

*Primary Examiner* — Vishal Pancholi
(74) *Attorney, Agent, or Firm* — Hudak, Shunk & Farine Co. LPA

(57) ABSTRACT

An at least partially heatable line-connector for a media line which can be heated, the line-connector at least partially including a thermally-conductive or thermally-conducting material, with a heating system and/or heating elements being associated outside the body of the line-connector. An assembled media line with at least one heatable media line is provided with at least one such at least partially heatable line-connector.

21 Claims, 7 Drawing Sheets

(58) Field of Classification Search
USPC .................................................. 138/33, 35
See application file for complete search history.

(56) References Cited

U.S. PATENT DOCUMENTS

| | | | | |
|---|---|---|---|---|
| 2009/0066077 A1* | 3/2009 | Colosimo | ............ | F01N 3/2066 |
| | | | | 285/41 |
| 2009/0308466 A1* | 12/2009 | Haeberer | ............. | F01N 3/2066 |
| | | | | 137/334 |
| 2010/0206415 A1* | 8/2010 | Ellis | ...................... | F16L 53/007 |
| | | | | 138/33 |
| 2010/0253067 A1* | 10/2010 | Isenburg | ............... | F16L 53/008 |
| | | | | 285/41 |
| 2010/0263740 A1* | 10/2010 | Borgmeier | ............. | F16L 25/01 |
| | | | | 137/341 |
| 2010/0290764 A1* | 11/2010 | Borgmeier | ............. | F16L 25/01 |
| | | | | 392/468 |
| 2013/0336643 A1 | 12/2013 | Borgmeier et al. | | |

FOREIGN PATENT DOCUMENTS

| | | |
|---|---|---|
| DE | 20 2007 010 502 U1 | 1/2009 |
| DE | 11 2008 003 310 T5 | 11/2010 |
| EP | 0 284 669 A1 | 10/1988 |
| EP | 1 777 452 A2 | 4/2007 |
| EP | 1 985 908 A1 | 10/2008 |
| EP | 2 102 464 B1 | 7/2010 |
| WO | 2005 124219 A1 | 12/2005 |
| WO | 2006018384 A1 | 2/2006 |
| WO | 2007 032034 A1 | 3/2007 |
| WO | 2009 124910 A1 | 10/2009 |

* cited by examiner

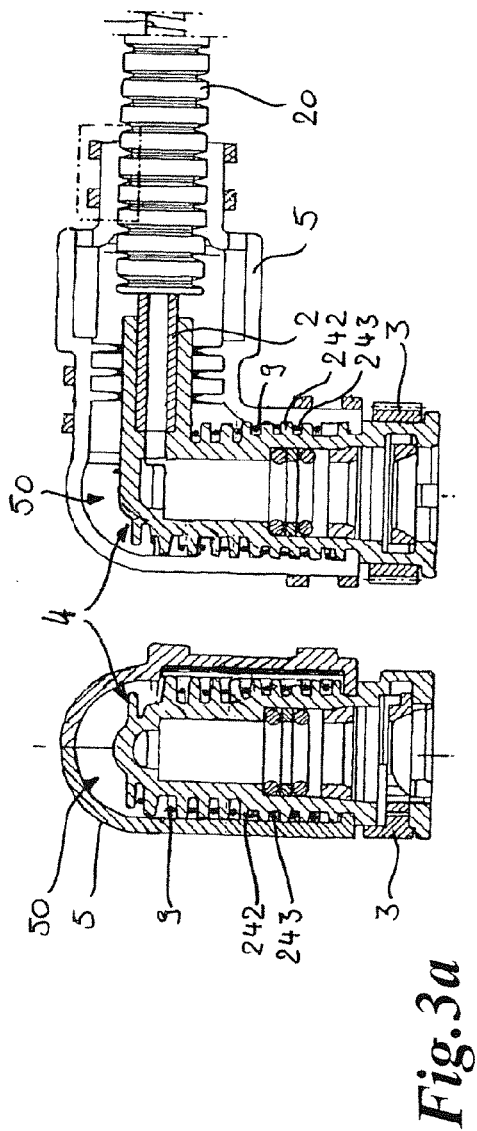
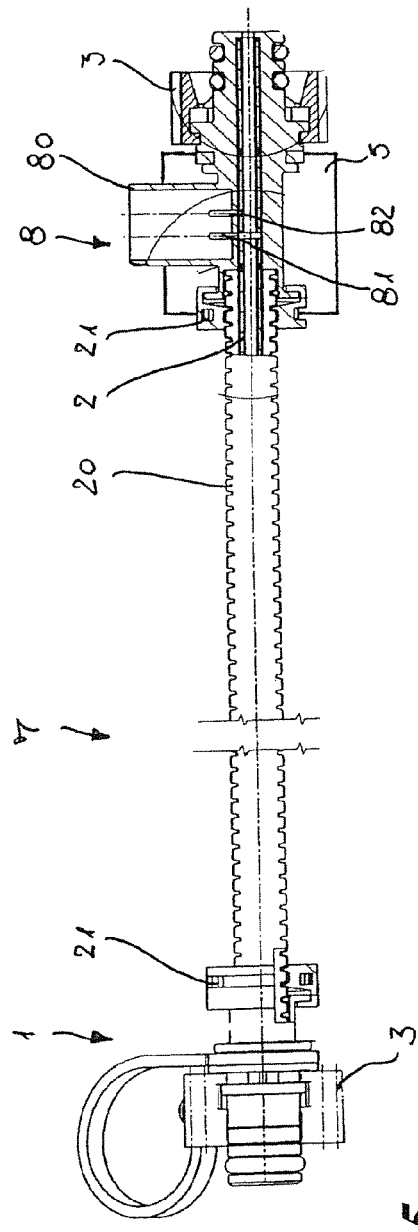
Fig.3a
Fig.3b
Fig.5

AT LEAST PARTIALLY HEATABLE LINE-CONNECTOR FOR A HEATABLE MEDIA LINE, AND AN ASSEMBLED MEDIA LINE COMPRISING SUCH A LINE-CONNECTOR

FIELD OF THE INVENTION

The invention relates to an at least partially heatable pipeline connector for a heatable media pipeline and also an assembled media pipeline with at least one heatable media pipeline and with at least one at least partially heatable pipeline connector.

BACKGROUND OF THE INVENTION

Assembled media pipelines with heatable media pipelines and at least partially heatable pipeline connectors are known in the prior art. In vehicles in particular, media pipelines for conveying mostly fluid media are provided. At low temperatures, the media pipelines threaten to freeze, for which reason, heating is provided. Pipeline connectors are used for connecting at least two media pipelines or for the connection of a media pipeline to a desired unit. Often such media as tend to freeze even at quite high environmental temperatures, owing to a relatively high freezing point, are conveyed through the media pipelines, as a result of which the functionality or a vehicle may be impaired or even disturbed considerably. This is particularly apparent in the case of water pipelines for windscreen-washing systems, just as in the case of media pipelines, by means of which aqueous carbamide solution is transported as a medium, which is used as $NO_x$ reaction additive for diesel engines with so-called SCR catalytic converters.

A device is known from EP 2 102 464 B1 for conveying a fluid medium with a heated feed pipeline and at least one system component with a heated interior, wherein the feed pipeline comprises a pipeline attachment piece and the system component comprises a module connection piece which is coupled directly or indirectly to the pipeline connection piece. Further, the device comprises at least one heat-conducting sleeve, which is plugged into the pipeline connection piece and the module connection piece. In this case, the heat-conducting sleeve is thermally coupled to the heated feed pipeline or the heated interior for transmitting heat, wherein the heat-conducting sleeve produces a fluid connection of the feed pipeline and the interior of the system component. The heat-conducting sleeve consists of a metal, particularly copper, aluminium, brass, zinc, silver, gold, magnesium, tungsten, graphite or a thermally conductive plastic, which is filled with graphite or metal particles.

In the event of the freezing of the medium conveyed through the feed pipeline and the system component, there is the problem that the thin-walled heat-conducting sleeve is pushed out of the interior of the system component. Further, the installation of the heat-conducting sleeve in the transition region of feed pipeline and system component is connected with not-insignificant costs and outlay.

SUMMARY OF THE INVENTION

The present invention is therefore based on the object of providing a possibility for at least a partial heating of a pipeline connector, which solves this problem and is more cost effective.

The object is achieved for an at least partially heatable pipeline connector for a heatable media pipeline wherein the pipeline connector consists at least to some extent of a thermally conductive or heat-conducting material, wherein a heating system and/or heating elements are assigned outside of the body of the pipeline connector. For an assembled media pipeline, the object is achieved in that the same is provided with such a pipeline connector. Developments of the invention are defined in the dependent claims.

As a result an at least partially heatable pipeline connector for a heatable media pipeline and also an assembled media pipeline, comprising a heatable media pipeline and at least one such pipeline connector, is created, in which a heat-conducting sleeve is no longer additionally plugged into the transition region or connection region of media pipeline and pipeline connector, which is pushed out of the pipeline connector in the case of the freezing of the medium conveyed in the media pipeline and in the pipeline connector owing to the here resultant volume expansion and thus can no longer effect heating of the pipeline connector and the corresponding part of the media pipeline. Rather, the pipeline connector itself is constructed in a thermally conductive or heat-conducting manner, so that the latter is used for heating the medium passing through. Thus, no costs are incurred for the additional installation of a heat-conducting sleeve, as is disclosed in EP 2 102 464 B1. Heat is introduced or coupled directly into the thermally conductive or heat-conducting material of the pipeline connector by means of heat conduction or heating. No heating elements are provided in the body of the pipeline connector. Heating elements can be arranged on the outside of the pipeline connector and/or a heating system, which couples heat into the pipeline connector, can be provided, particularly by means of the media pipeline connected to the same and/or by means of heating elements located internally in the flow channel of the media pipeline. As a loose-fitting heat-conducting sleeve is no longer provided, the problem of the same being pushed out in the event of the freezing of the through-conveyed medium does not exist. Also, the complex installation of such a heat-conducting sleeve on an existing pipeline connector and media pipeline is dispensed with. Further, when constructing the pipeline connector from a thermally conductive or heat-conducting material, the flow cross section can be maintained, unlike when inserting a heat-conducting sleeve, wherein the flow cross section of an inner through-opening is limited throughout the pipeline connector.

The pipeline connector advantageously consists at least for the majority of the region of a thermally conductive or heat-conducting material, in which medium can be conveyed through or is conveyed through the pipeline connector, that is to say in which medium comes into contact with the pipeline connector. It proves particularly advantageous if the thermally conductive or heat-conducting material of the pipeline connector is a material which conducts heat better than the material or at least one of the materials of the media pipeline. As a result, it is ensured in the connection region of the media pipeline to the pipeline connector that the part of the pipeline connector consisting of the thermally conductive material is heated and heat does not flow out of the pipeline connector into the media pipeline. In order to ensure that the pipeline connector, which is conventionally thicker with respect to the material or wall thickness thereof, is heated at least in a large part of the region, in which medium is conveyed through the same, the provision of a material in this region of the pipeline connector that conducts heat better compared to the material of the media pipeline proves very advantageous. In the case of the provision of a media pipeline jacket made up of a plurality of layers, a so-called multilayer construction, is used in particular, which conducts heat better than at least one of the materials of the media pipeline.

The thermally conductive material can for example be a thermally conductive plastic. Advantageously, the same has a thermal conductivity of 1-20 W/(m·K), particularly 1 to 7 W/(m·K). Although a high filler proportion in the thermally conductive plastic increases the thermal conductivity, it deteriorates the mechanical properties of the plastic considerably, as the same becomes very brittle due to a very high filler proportion and thus the strength thereof falls sharply. Thus, especially in the case of a thermal conductivity in the range of 1-7 W/(m·K), a good compromise of good mechanical properties of the plastic and an acceptable thermal conductivity can be provided.

The pipeline connector can have at least one part constructed as a connection section, particularly in a plug-like manner, which is constructed and/or provided for engaging into a coupling part, wherein the thermally conductive or heat-conducting material is provided at least in the region of the connection section. The coupling part can e.g. be part of a connection to a unit or a unit itself. On account of the engagement of the connection section, particularly a part constructed in a plug-like manner, into the coupling part or conversely of a part constructed in a plug-like manner into the connection section, heat transport from the one into the other part can take place. As a result, the transition region to a unit or the media pipeline can be heated, so that there also an already frozen medium can be or again or it can be prevented that the medium conveyed in the media pipeline, the transition region to the pipeline connector and in the same freezes.

Preferably, the pipeline connector comprises at least one thermally conductive or heat-conducting sleeve component, which is securely connected to the same, is particularly constructed as a two-component injection moulding, insertion part or press-in part and securely connected to the same. The thermally conductive or heat-conducting sleeve component advantageously consists of a thermally conductive or heat-conducting plastics and is securely connected to the conventional body of the pipeline connector e.g. by means of injection, insertion or pressing-in. In the event of the provision of a heat-conducting sleeve subsequently inserted into an existing pipeline connector, the through-flow cross section of the pipeline connector is severely reduced in this region. If a thermally conductive or heat-conducting sleeve component is also directly integrated into the pipeline connector during the production of the same, in order to provide thermal conductivity and a heating of the pipeline connector in the region, through which the medium flows, the internal diameter of such a sleeve component can be chosen to be so large as is also otherwise provided as the internal diameter of the through-opening through the pipeline connector for conveying medium through. A thin-walled metal sleeve, which therefore only slightly narrows the internal diameter of the through-opening through the pipeline connector for the through-flow of medium and which has a high conductivity owing to the use of metal, e.g. a sleeve made up of high-grade steel or aluminium. High-grade steel is particularly suitable for the use in fuel cells, in which deionised water flows as medium through pipeline connector and media pipeline. As high-grade steel is difficult to process, however, aluminium is preferred in principle. The problem of corrosion and the necessity of providing a corrosion protection arises in the case of aluminium, however. In order to solve this problem, a coating with a corrosion-protection agent can be provided. As a result, such a metal sleeve is expensive and more difficult to produce, however. For this reason, a sleeve component made from aluminium can be used in particular. In this case, it is possible, to press or insert such an aluminium sleeve into the pipeline connector during the production of the same, that is to say to securely integrate the aluminium sleeve into the pipeline connector. The throughflow diameter or through-streaming diameter, for the through-flow with medium is barely reduced in the case of the provision of such an aluminium sleeve, owing to the thin-walled nature of the same. Further, it is possible to construct the sleeve component from a thermally conductive or heat-conducting plastic and to integrate it into the pipeline connector during the production of the same. Integration as a two-part injection moulding is for example possible.

The pipeline connector can be constructed as a multiple-component part, particularly as a two-component injection moulding, wherein at least a part is constructed in a conductive manner. A connection section for connecting to the media pipeline is advantageously constructed in a laser-transparent manner. As thermally conductive materials cannot conventionally be laser welded, it proves very advantageous when providing a multiple- or two-component part to construct the part, which is provided for connecting the media pipeline or other units, in a laser transparent manner, in order to enable a connection via laser welding there.

Further advantageously, the pipeline connector comprises an insulating apparatus for thermal and/or electrical insulation, in particular, the pipeline connector is at least partially surrounded by an insulating and/or protective apparatus or protective cap incorporating at least one air volume for thermal insulation, and/or an insulating apparatus for the external thermal insulation is provided in the region of a connecting section for connecting to a plug or the media pipeline, particularly a fastening clip, which incorporates an air volume or an air gap for the pipeline connector. For example, a connecting or coupling section can be arranged externally surrounding a fastening clip according to WO 2006/018384 A1 at least to some extent. An air gap or an air volume incorporated between the pipeline connector and the insulating apparatus is used for thermal insulation. By providing one or a plurality of insulating apparatuses, heat losses in the region of the pipeline connector can be limited or even suppressed. Insulating and/or protective apparatus or protective cap and fastening clip can also consist of an insulating material. Further, an encapsulation is possible as external protection of the pipeline connector and the attachment or connection sections from mechanical and, depending on choice of material, also from chemical damage. A coating of the pipeline connector, particularly comprehensive coating, with an external housing can be provided as encapsulation. Further, a so-called shrink-down plastic tubing, fabric hose or the like can be provided as encapsulation. When providing the encapsulation, an air volume can be incorporated between the pipeline connector and the encapsulation, as a result of which a good heat distribution and good thermal insulation with respect to the surroundings, that is to say with respect to the outside, can be achieved.

The pipeline connector can further be constructed in such a manner that heat can be coupled into the pipeline connector in the radial direction, particularly in the connecting region to the media pipeline, by means of an apparatus for heat coupling. Here, for example heat is coupled into the jacket of the media pipeline by means of one or a plurality of heating elements, transported axially via the jacket thereof to the end of the media pipeline and, in the region of the pipeline connector into which the end of the media pipeline is inserted, coupled radially out of the jacket of the media pipeline into the pipeline connector. Particularly in the case of the provision of a higher thermal conductivity of the material of the pipeline connector compared to the material of the media pipeline, this coupled-in heat can be rapidly forwarded within the same, so that a heating of the pipeline connector is possible by means of the media pipeline. For axial thermal transport within the pipeline connector, the same is advantageously provided with a wall thickness of 1 to 20 mm, particularly with a wall thickness of 2 to 5 mm.

The pipeline connector can be provided with at least one fastening component and/or guide component for the external arrangement of heating elements and for improving the introduction of heat, particularly with a ribbed structure. By means of such fastening components or guide components or such a ribbed structure, heating elements can be fixed in a targeted fashion in terms of the position thereof on the outside of the pipeline connector, where the same can be connected to leads or an electrical feed line or where an external wrapping of the pipeline connector with heating elements should take place. The coupling-in of heat in this case takes place from the heating elements arranged externally around at least a part of the pipeline connector, via the thermally conductive material into the interior of the pipeline connector or to the sections of the pipeline connector, which should be heated, an thus are provided with the thermally conductive or heat-conducting apparatus or constructed from thermally conductive or heat-conducting material.

The media pipeline is also advantageously provided with at least one heating element, particularly at least one heating element extending continuously along the media pipeline. In particular, the media pipeline is provided with at least one heating wire, particularly two heating wires at least to some extent. The heating element or the at least one heating wire can be arranged externally and/or internally with respect to the media pipeline. Further, arrangement in the jacket of the media pipeline in one or a plurality of layers of the same. The media pipeline or the jacket of the media pipeline can in particular contain at least one layer made up of an electrically conductive and/or electrically and/or thermally conductive plastic. The layer or heat-generating layer can have heating elements for heating the plastic material, thus heating of the layer is possible directly. When providing such a conductive or conducting layer in the jacket of the media pipeline, contacting components are advantageously provided, particularly guided outwards through the jacket of the media pipeline, in order to be able to provide a supply of electrical energy there. In particular, leads can be connected there, which for their part are connected to an electrical energy source. For the pipeline connector, a supply of electrical energy can take place in the region of a connection section, particularly a plug-like or pipeline connection section and/or a coupling section. Advantageously, the energy supply takes place there both for the media pipeline and for the pipeline connector. For example, the ends of the heating elements, which are provided for heating the media pipeline and which are provided for heating the pipeline connector, are suitably connected and the connection points are accommodated in a protected manner within the insulating and/or protective apparatus.

In particular at least one heating strand can be arranged in the region of the pipeline connector, particularly one, two or four heating strands. When providing a heating strand, the same advantageously extends continuously along the media pipeline and the at least one pipeline connector, thus starts at the one pipeline connector, extends along the media pipeline to the other pipeline connector and if appropriate beyond the same, back to the first pipeline connector, and is thus guided along the media pipeline, double laid internally, externally and/or in the jacket of the media pipeline. In the case of the provision of two heating strands, both advantageously extend along the media pipeline and at least one of the two heating strands is advantageously provided for wrapping the pipeline connector. In the case of the provision of four heating strands, two advantageously extend along the media pipeline and two heating strands are advantageously provided for wrapping the pipeline connector. The one heating strand surrounding the pipeline connector is connected to one of the two heating strands extending along the media pipeline. The other heating strand extending along the media pipeline and also the other end of the heating strand surrounding the pipeline connector at least to some extent are connected to the electrical energy supply, particularly leads. The two heating strands extending along the media pipeline can thus be connected at the ends thereof to one another and/or to a further heating strand or leads for the energy supply. Accordingly, both in the case of the provision of two heating strands and in the case of the provision of four heating strands, it is possible to provide the supply of electrical energy only in the region of one of the two pipeline connectors, which are provided at the end of the media pipeline.

Further, a different number of heating strands can be provided on the one pipeline connector than on the other. For example, the one pipeline connector can be provided with two heating strands and the other with four heating strands, wherein two heating strands in each case are used for each of the pipeline connectors for wrapping the same. By providing a different number of heating strands, or generally heating elements, at the two pipeline connectors of the assembled media pipeline, different heat quantities can be introduced into the pipeline connectors.

A thermally conductive material with an elongation at break of 1 to 10%, particularly with an elongation at break of ≥2% and with a tensile strength of more than 50 MPa, particularly more than 80 MPa is suitable as material for the pipeline connector consisting at least to some extent of thermally conductive and heat-conducting material. Is proves particularly advantageous to provide a mineral filler, particularly long glass fibres with a diameter of >0.2 mm. Short fibres can likewise be used. For example, a material based on carbon, particularly graphite, can be used as filler. When using long glass fibres, a tensile strength of more than 140 MPa with an elongation at break of 2% is possible in the case of a polymer material. When using short glass fibres, a polymer material with a thermal conductivity of 5 W/(m·K) can for example be provided, which has a tensile strength of approximately 70 MPa and an elongation at break of less than 1%, wherein a carbon-based material is used as filler. However, the use of short fibres leads to a plastic material which is virtually twice as expensive compared to using long glass fibres, so that, with regards to a cost saving, the use of long glass fibres is preferred, particularly preferably also with regards to the possible higher tensile strength. With regards to a long-term contact with an aqueous carbamide solution, such as AdBlue®, a mineral material or a mineral-based material, which has sufficient stability with respect to long-term loading with this substance, is suitable as filler. As already mentioned, alternatively or additionally to the use of plastic material, a metal can be used as thermally conductive or heat-conducting material, particularly high-grade steel, which proves particularly suitable when conveying through deionised water in the case of application in fuel cells.

BRIEF DESCRIPTION OF THE DRAWINGS

For a more detailed description of the invention, exemplary embodiments of the same are explained in more detail on the basis of the drawings in the following. In the figures:

FIG. 3a shows a longitudinal sectional view of a further embodiment of a pipeline connector according to the invention with external ribbed structure for inserting heating elements, FIG. 3b shows a cross-sectional view of the pipeline connector according to FIG. 3a, FIG. 4 shows a cross-sectional view through a fourth embodiment of a pipeline connector according to the invention, FIG. 5 shows a side and to some extent cross-sectional view through an assembled media pipeline with pipeline connectors according to the invention in a fifth embodiment.

DETAILED DESCRIPTION OF THE INVENTION

Figure 1:
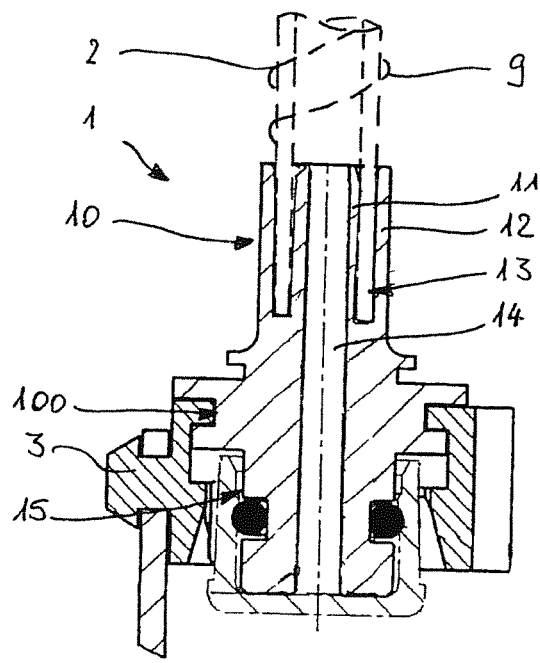
FIG. 1 shows a cross-sectional view through a first embodiment of a pipeline connector according to the invention.

Shown in FIG. 1 is a cross-sectional view of a pipeline connector 1, which consists entirely of a thermally conductive material. The pipeline connector 1 is of straight construction. It has a pipeline connection section 10 and a coupling section 15. The pipeline connection section 10 of the pipeline connector has an inner sleeve-shaped, plug-like part 11 and also an external sleeve-shaped part 12 externally surrounding the same and arranged with spacing from the same. The wall of a media pipeline 2, which is indicated dashed, is plugged into the intermediate space 13 between the sleeve-shaped, plug-like part 11 and the external sleeve-shaped part 12. The media pipeline 2 can be heated by means of heating elements 9, wherein in the embodiment shown, the heating of the pipeline connector 1 takes place by means of heat transfer from the heated media pipeline 2 via the pipeline connection section 10 to the pipeline connector 1. For this purpose, the pipeline connector shown in FIG. 1 consists of a thermally conductive material, which conducts heat better than the material of the media pipeline 2. As a result, a heating of the pipeline connector 1 is very possible by means of heat transfer from the media pipeline 2 to the pipeline connector 1. A medium, which can flow through an inner through-opening 14 of the pipeline connector 1, can therefore be protected from freezing or thawed again, insofar as the same medium flowing within the media pipeline 2 and the pipeline connector 1 should be frozen.

A unit can for example be connected to the coupling section 15. This is merely indicated in FIG. 1 by means of dashed lines. The inner through-opening 14 extends through the pipeline connection section 10 and the coupling section 15. A fastening clip 3 is provided for externally insulating the coupling section 15 of the pipeline connector 1 and for connecting the pipeline connector 1 to a unit or a unit plug. The same is used for holding the unit plug joined onto the coupling section 15 and for externally thermally insulating the coupling section, in order to keep the heat losses as small as possible here, so that this coupling section can also be kept sufficiently warm and thus freezing of the medium flowing through the internal through-opening 14 can be prevented or the same can be thawed again after a possible freezing.

Figure 2:
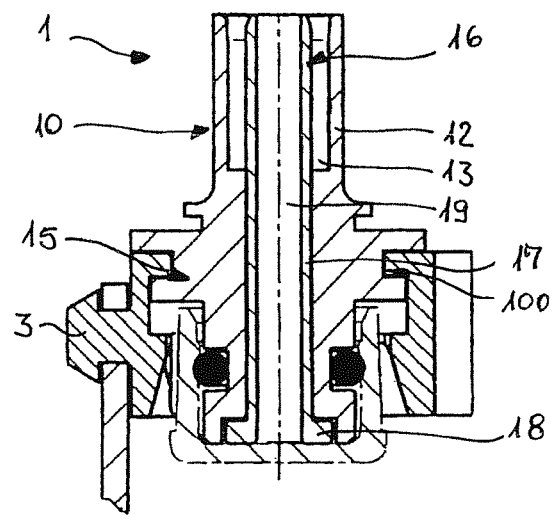
FIG. 2 shows a cross-sectional view through a second embodiment of a pipeline connector according to the invention.

Shown in FIG. 2 is a further embodiment of the pipeline connector 1. In this design variant, in contrast with the embodiment according to FIG. 1, the pipeline connector 1 is provided with a thermally conductive sleeve component 16 securely installed in the same. The same comprises a sleeve-shaped, plug-like part 17 and an overhanging flange-like part 18. It extends through the entire longitudinal extent of the pipeline connector 1 from the end of the pipeline connection section 10 to the opposite end of the coupling section 15. The flange-like part 18 of the sleeve component 16 overhangs in a plate-like or flange-like manner there, that is to say in the region in which a connection to a unit plug or a unit, etc. is possible, so that a better coupling in of heat is possible there at the end face. The heat-conducting or thermally conductive sleeve component 16 can be produced as a separate part and inserted into the pipeline connector during the production thereof and fastened, particularly pressed, into the same. Further, it is possible to construct the pipeline connector as a two-component injection moulding, wherein the heat-conducting or thermally conductive sleeve component 16 forms the part and the remaining body of the pipeline connector 1 forms the other part. As the sleeve component 16 is integrated into the pipeline connector 1 during the production of the same, the internal through-opening 19 is provided in the sleeve component with an internal diameter corresponding to the diameter of the internal through-opening 14 in the embodiment of the pipeline connector 1 according to FIG. 1. In contrast with the subsequent insertion of a separate heat-conducting sleeve into an existing pipeline connector, in which the diameter of the internal through-opening is reduced by the double wall thickness of the heat-conducting sleeve, this is not the case when providing the heat-conducting or thermally conductive sleeve component 16, as the thickness of the sleeve component 16 already can be or is taken into account during the production of the pipeline connector 1.

Figure 3:
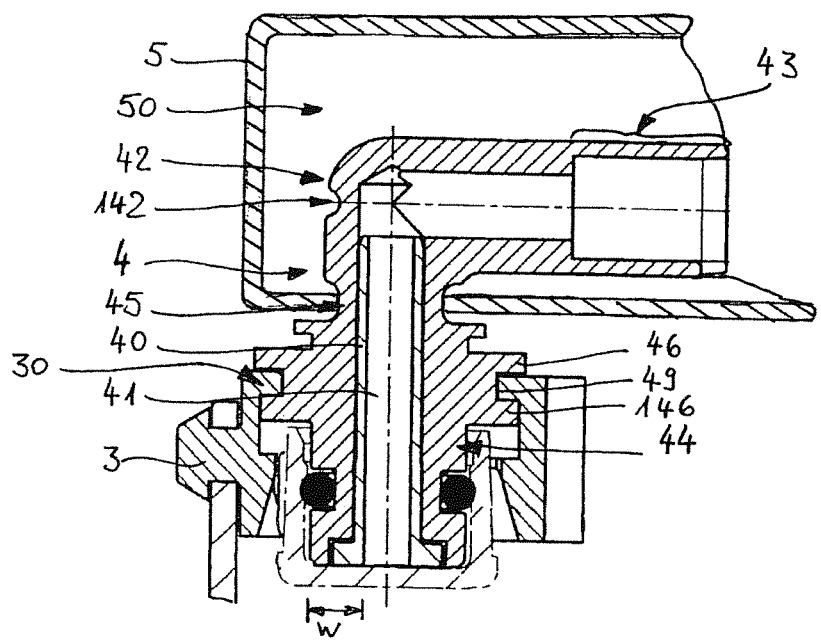
FIG. 3 shows a cross-sectional view through a third embodiment of a pipeline connector according to the invention.

Shown in FIG. 3 is a further embodiment of a pipeline connector according to the invention, which, by contrast with the embodiments according to FIGS. 1 and 2, is constructed as an angled pipeline connector 4. The same also has a heat-conducting sleeve component 40, like the embodiment of the pipeline connector 1 according to FIG. 2, so that it is not necessary that the remaining body of the pipeline connector 4 consists of a heat-conducting or thermally conductive material. The heating of the heat-conducting or thermally conductive sleeve component 40 is already sufficient for heating a medium flowing within the internal through-opening 41. The heat-conducting sleeve component 40 ends in an angled section 42 of the pipeline connector 4, wherein this is satisfactory, in order to allow heating of medium flowing through the pipeline connector 4 and prevent freezing of the same or in order to thaw the same after freezing. The sleeve component 40 preferably protrudes as far as into the region of the pipeline connector that is wrapped by a heating conductor or heating element. Instead of the straight, end-side construction of the sleeve component 40, as is shown in FIG. 3, the same can also be constructed to be angular at the end, that is to say provided with a bevel cut at the end, or be constructed longer than is shown in FIG. 3.

A pipeline connection section 43 of the pipeline connector 4 connecting to the angled section 42 is laser-transparent in this design variant, in order to enable a connection in this region using a laser. In FIG. 3, the pipeline connection section 43 is the region, in which the bore part of the stepped bore with the larger diameter is located, into which the end of the media pipeline 2 is pushed and fastened therein. The external sleeve-shaped part 12 of the pipeline connection section 10 of the pipeline connector 1 according to FIG. 1 is preferably constructed in a laser-transparent manner, in order to allow the use of a laser for connecting by means of laser welding. As thermally conductive materials, particularly plastics, are not usually laser-transparent, a different material, namely a laser-transparent material, is used, for the pipeline connection section 43 of the pipeline connector 4 according to FIG. 3 or the external sleeve-shaped part 12 of the pipeline attachment section 10 of the pipeline connector 1, wherein a two-component injection moulding can also be produced here.

To insulate and to externally protect the section of the pipeline connector 4 provided with the pipeline connection section 43, the same can be provided with an encapsulation 5 externally, wherein an air gap 50 remains between encapsulation 5 and pipeline connector 4, that is to say an air volume is enclosed, which is used for insulation. This is indicated in FIG. 3. Encapsulations 5 of this type can in particular be constructed as two half shells, in order to enable a problem-free installation after the joining of pipeline connector and media pipeline. The construction e.g. as coating of the pipeline connector or the form of shrink-down plastic tubing or fabric hose jacket is furthermore possible.

In the case of the embodiment of the pipeline connector 4 according to FIG. 3 also, a coupling section 44 is surrounded by the fastening clip 3 at least to a large extent, in order here on the one hand to enable a fastening for example of a plug of a unit or the like and on the other hand to enable an external thermal insulation of the coupling section 44.

In the transition region of coupling section to angled section 42, a centring shoulder 45 is constructed, which, owing to the angular shape of the pipeline connector 4, proves very helpful for the installation of the various components on the pipeline connector 4. Further, apparatuses for fixing and/or for guiding the heating elements are provided externally on the pipeline connector 4, of which a groove 142 on the angled section 42 is shown by way of example in FIG. 3. A heating element can be inserted into this groove 142, in order to be able to couple heat from outside into the pipeline connector in a targeted fashion at desired positions. By means of an apparatus for fixing the heating elements, the same are fastened on the pipeline connector, merely loosely inserted into an apparatus for guiding.

The FIGS. 3a and 3b show an external ribbed structure with individual ribs 242 and grooves 243 arranged therebetween as guide apparatuses, into which heating elements 9 are inserted. The air gap 50 or the air volume between pipeline connector 4 and encapsulation 5, which effects the actual insulation, is also to be seen particularly well in these figures.

The wall thickness w of the pipeline connector can be 2 to 5 mm in the coupling region in particular, wherein the largest wall thickness in the region of a flange-like overhang 46 is 20 mm for example. A fastening section 30 of the fastening clip 3 is supported on the flange-like overhang 46, which is arranged in a groove 49 of the coupling section 44. The groove is formed between the overhang 46 and an overhang 146 at a distance therefrom.

The fastening clips 3 can be arranged completely around the respective coupling section of the pipeline connector or constructed in a c-shaped manner, so that the same surround only a part region of the respective coupling sections. A fastening track, particularly the previously mentioned groove, can be provided for latching onto the respective pipeline connector. Such a fastening groove 100 or 49, into which the fastening section 30 of the respective fastening clip 3 engages, is shown in FIGS. 1 to 4.

Figure 4:
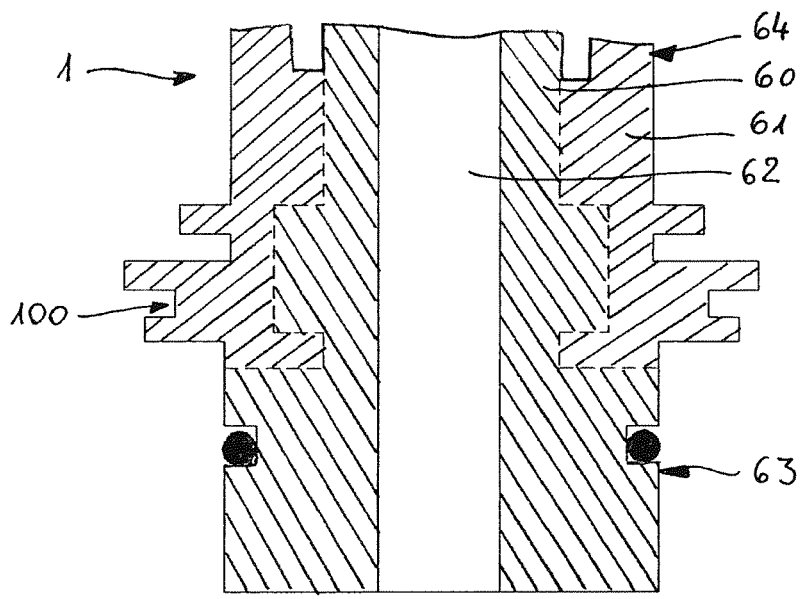

FIG. 4 shows a sketched cross-sectional view through a further embodiment of a pipeline connector 1 according to the invention. The pipeline connector sketched here in FIG. 4 is constructed as a two-component part and has an internal thermally conductive part 60 and also an external thermally insulating part 61. The thermally conductive part extends in the interior of the pipeline connector and comprises an internal through-opening 62, through which the medium to be heated can flow. The external insulating part 61 extends in the region of the pipeline connector, which is provided with a media pipeline for connecting or plugging together. The internal thermally conductive part 60 extends onto the outer side of the pipeline connector 1 and forms a coupling section 63. A fastening clip 3 can in turn be arranged surrounding the same, in order to provide an external insulation. This is not shown however in FIG. 4. The connection region 64 for connecting the media pipeline, shown only partly in FIG. 4, is advantageously laser-transparent, thus in particular the material of the external insulating part 61. As a result, a use of a laser for fastening the media pipeline on the pipeline connector 4 is possible.

FIG. 5 shows a side view and partially cutaway view of an assembled media pipeline 7. The same comprises two pipeline connectors 1, 8 and also the media pipeline 2 connected to the same. The media pipeline 2 is surrounded by a corrugated pipe 20. Arranged in the fastening region of the corrugated pipe on the two pipeline connectors 1, 8 are fastening clips 21. Furthermore, fastening clips 3 are arranged on both pipeline connectors 1, 8, wherein the fastening clip 3 arranged on the pipeline connector 8 is illustrated cutaway and the fastening clip 3 arranged on the pipeline connector 1 is shown in a side view. The latter is constructed in a c-shaped manner, as can be drawn from FIG. 5.

The pipeline connector 8 according to FIG. 5 has a side-branching connection section 80. Pin-like components 81, 82 protrude into the same as electrical contacts for a power connection. The pins 81, 82 are connected to the jacket 22 of the media pipeline 2 or to the heating elements guided therein or a thermally conductive layer of the media pipeline 2. Connection to heating conductors or leads in the interior of the connection section 80 is thereby possible.

The part of the pipeline connector 8 surrounding the connection section 80 in particular can, as indicated in FIG. 5, be surrounded by an encapsulation 5, in order to provide insulation and at the same time external protection. As indicated in FIG. 5, a part of the fastening clip 21 can be accommodated in the encapsulation 5.

Figure 6:
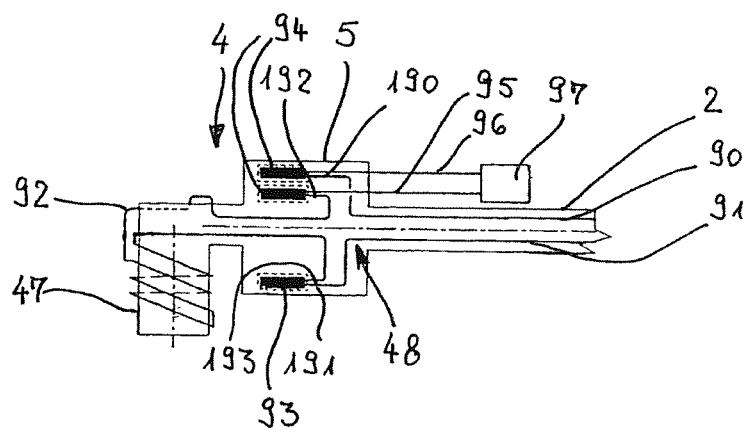
FIG. 6 shows a side sketched view of a pipeline connector according to the invention with attached heatable media pipeline, wherein a media pipeline comprising four heating strands can be constructed using this heating element arrangement.
Figure 7:
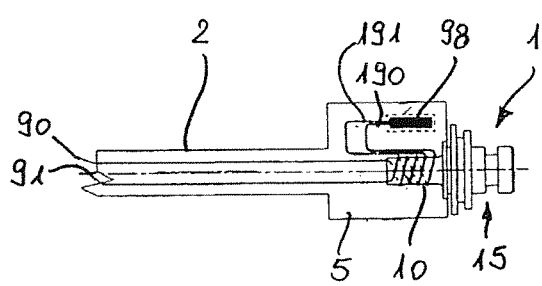
FIG. 7 shows a side sketched view of a pipeline connector according to the invention with attached heatable media pipeline, wherein a media pipeline comprising two heating strands can be constructed using this heating element arrangement.

The FIGS. 6 and 7 show possible design variants of the heating of angled and straight pipeline connectors, that is to say the heat supply and also the arrangement of the heating strands provided to this end within the pipeline connectors. According to FIG. 6, three heating strands are arranged within the pipeline connector 4 or the encapsulation 5. Two heating strands 90, 91 extend along the media pipeline 2 into the pipeline connector 4 or the encapsulation 5, particularly protective cap. A further heating strand 92 is wound around a coupling section 47 of the pipeline connector 4, in order to be able to heat the same, and guided to a connection section 48 of the pipeline connector 4. The respective ends 192, 193 of the heating strand 92 are connected to the heating strand 91 or the end 191 thereof and a lead 95 at the connection or crimp points 93, 94. The end 190 of the first heating strand 90, which is guided through the media pipeline 2, is connected to a second lead 96. The two leads 95, 96 are guided to a plug 97, which can be plugged into an electrical energy supply apparatus.

Other wirings of the heating strands for the electrical contacting of the same are also possible.

As can be drawn from FIG. 7, here the two heating strands 90, 91 are initially guided along the media pipeline 2, subsequently coiled around the pipeline connection section 10 within the pipeline connector 1, wherein both heating strands 90, 91 are arranged coiled around the plug section. Both heating strands 90, 91 are connected to one another, particularly crimped, within the encapsulation 5, which surrounds the pipeline connector 1. This is indicated by a connection or crimp point 98 in FIG. 7. No connection to an electrical energy supply is provided here. This can take place in the region of the other opposite pipeline connector.

The connection or crimp points 93, 94, 98 shown in the FIGS. 6 and 7 can in each case be enveloped by shrink-down tubing and as a result externally sealed and protected. Furthermore, it is possible to coat the connection or crimp points 93, 94, 98 with a compound, which procedure is suitable in the event of higher temperature requirements on the media pipeline in particular. The connection or crimp points 93, 94, 98 are coated in an injection moulding process with at least one plastic, preferably a thermoplastic in particular. The connection or crimp points 93, 94, 98 can here be inserted into a die of an injection mould, which has at least one spring-loaded pin for guiding and/or positioning the connection or crimp point, so that the same does not touch the wall of the injection mould or the die. When filling the die with thermoplastic under pressure, the spring-loaded pin is pushed back and the connection or crimp point 93, 94, 98 is completely coated with the thermoplastic compound. Injection moulds of this and similar types and methods for the application thereof are known in the prior art.

Figure 8:
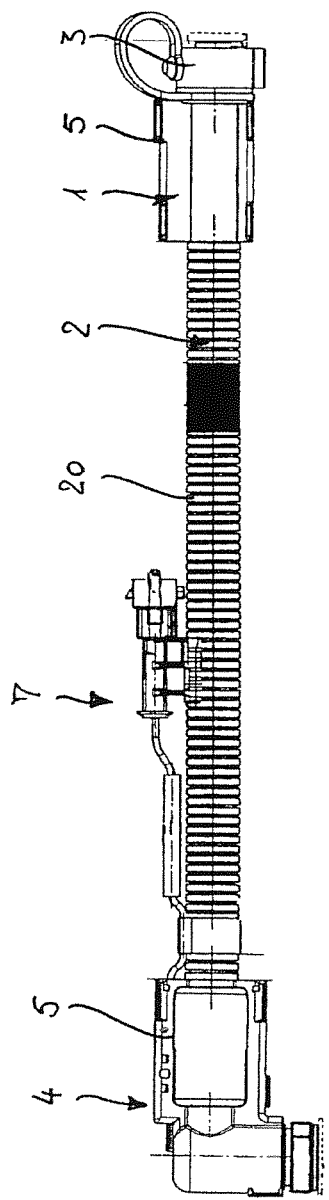
FIG. 8 shows a side view of an assembled media pipeline according to the invention, using the two end-side pipeline connectors, of which one is a straight pipeline connector and one is an angled pipeline connector.

FIG. 8 shows a combination of a straight pipeline connector, like the pipeline connector 1 according to FIG. 1, 2 or 4, and an angled pipeline connector 4, as shown e.g. in FIG. 3, wherein the two pipeline connectors 1, 4 with the media pipeline 2, the encapsulations 5 and a fastening clip 3 are shown ready-installed already as an assembled media pipeline 7.

Figure 9:
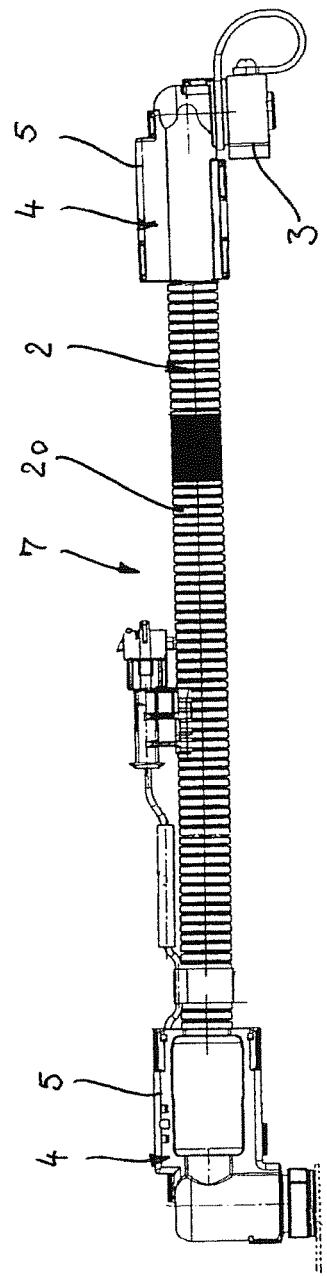
FIG. 9 shows a side view of an assembled media pipeline according to the invention, using the pipeline connector according to FIG. 6 and the pipeline connector shown in section in FIG. 3 and in FIG. 10.

In the embodiment of the assembled media pipeline 7 according to FIG. 9, instead of the pipeline connector 1, a further angled pipeline connector 4 is provided on the end of the media pipeline 2. The same is shown in detail in FIG. 10, wherein the one shell half of the encapsulation 5 constructed as protective cap is removed, in order to be better able to see the pipeline connector. Similarly to in the case of the pipeline connector according to FIG. 7, here also, the heating strands 90, 91 are connected or crimped to one another at the connection point 98. Heat is therefore externally coupled into the pipeline connector 4 here, so that heating of the internal through-opening through the pipeline connector is possible, in order to be able to heat the medium flowing therein. Only the pipeline connection section 43 and also the angled section 42 are externally heated, not however the coupling section 44. The heat makes it into the same by means of heat conduction, owing to the provision of a thermally conductive or heat-conducting material, as described for the FIGS. 1 to 4. The coupling section 44 of the pipeline connector 4 is used in turn for connecting to a unit plug, etc. which can be plugged on there.

Figure 11:
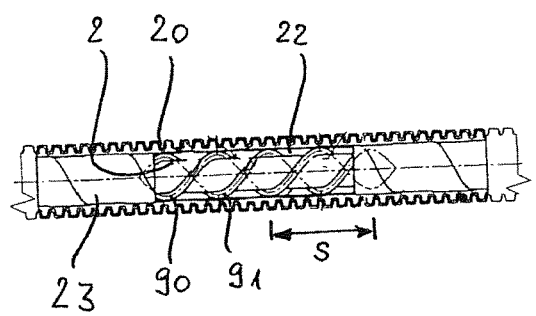
FIG. 11 shows a detailed view of the media pipeline according to FIG. 9.

The detail of the media pipeline 2 encapsulated with the corrugated pipe 20 is shown in FIG. 11. In the design variant shown in FIG. 11, the heating strands are guided externally around the media pipeline 2. A wrapping with adhesive tape or fabric adhesive tape 23 is provided for fixing and/or for external protection. This is likewise indicated in FIG. 11.

Instead of the arrangement of the heating strands 90, 91 on the outside of the media pipeline, as indicated in FIG. 11, the same can also be arranged in the jacket 22 of the media pipeline, so that the media pipeline has a thermally conductive jacket. Likewise, at least one layer of the jacket 22 of the media pipeline can be constructed in a heat-conducting manner. If the thermally conductive layer is guided to the end face of the media pipeline 2, a heat transfer from the heated media pipeline to the thermally conductive layer or the thermally conductive material of the pipeline connector can take place by means of the contact of the end face of the media pipeline with the corresponding thermally conductive region of the pipeline connector. Fundamentally, it is further possible to also guide heating strands or heating elements through the interior of the media pipeline. This is not shown however in FIG. 11.

The heating strands can be arranged along the media pipeline for example with a pitch s of 15 to 35 mm, particularly 20 to 25 mm. As a result, even in the case of bending of the pipeline during the later installation in a vehicle for example, a secure hold is just as possible as a very good heating of the medium conveyed inside the media pipeline.

Figure 12:
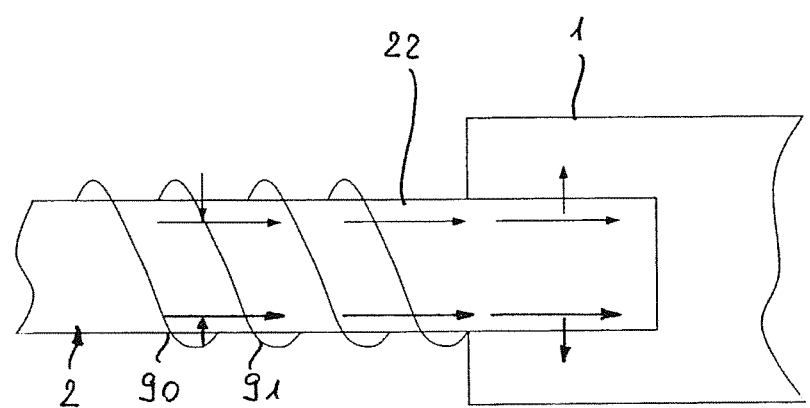
FIG. 12 shows a side, sketched view of the radial heat transfer from the media pipeline into a pipeline connector according to the invention.

A radial coupling of heat from the media pipeline 2 into the pipeline connector 1 is sketched in FIG. 12, wherein heat is coupled out of the jacket 22 of the media pipeline 2 radially into the pipeline connector. FIG. 12 shows the principle of the radial coupling of heat out of the media pipeline 2 or the heating strands 90, 91 provided along the same into the pipeline connector 1.

Figure 10:
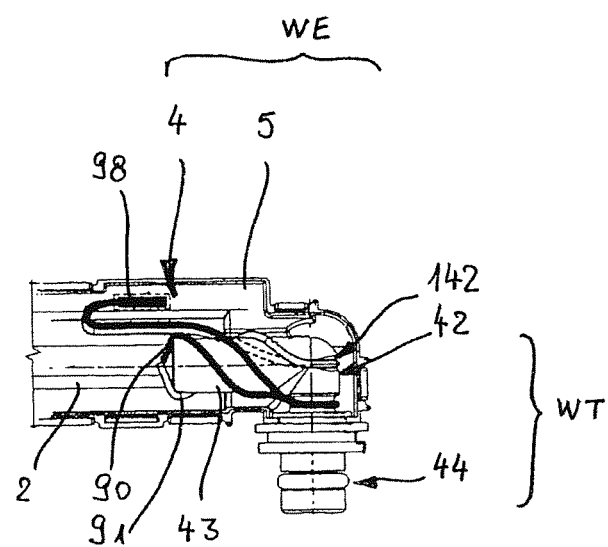
FIG. 10 shows a side view, partially cutaway, of the pipeline connector according to FIG. 3, without fastening clip, but with capsule.

As can be drawn from FIG. 10, the region, which is surrounded by the two heating strands 90, 91, is used as heat coupling region WE and the region, in which heat is transported, comprising the coupling section and the angled section is used as heat transport region WT. The heat transport region in particular is therefore constructed in a thermally conductive manner, particularly by means of the options shown in the FIGS. 1 to 4.

A material with a thermal conductivity of 1 to 20 W/(m·K), particularly 1 to 7 W/(m·K) is suitable as material for the pipeline connector or the thermally conductive part of the pipeline connector in particular. Furthermore, it proves advantageous to use a material which has an elongation at break of 1 to 10%, particularly an elongation at break of approximately 2%. A high thermal conductivity is achieved by means of a filler proportion which is as high as possible, which however severely impairs the mechanical properties, particularly of plastic, so that plastic becomes very brittle and the strength thereof decreases. Thus, a good compromise between the desired high thermal conductivity and good mechanical properties is selected. Principally mineral fillers, such as long glass fibres or short glass fibres are suitable as filler. For example, a polymer PA66 with long glass fibres can be used as filler, which has a tensile strength of approximately 145 MPa and an elongation at break of 2%, such as example Star-Therm® WG A-2 from the company EPIC Polymers Ltd., Kaiserslautern. A polymer PA 66 with short glass fibres is also suitable as a carbon-based (graphite) filler with a tensile strength of 60 MPa and an elongation at break of 0.9%, for example the product Alcom PA66 910/30.1 GF15 TCE5 of the company ALBIS Plastic GmbH, is likewise suitable, as it is very conductive. Other thermally conductive materials are also suitable for producing the pipeline connector, particularly also material combinations.

In addition to the previously described design variants, which are shown in the drawings, of pipeline connectors and assembled media pipelines with such pipeline connectors, numerous further design variants can also be formed, in which in each case, the pipeline connector consists at least to some extent of a thermally conductive or heat-conducting material, wherein no heating elements are embedded in the body of the pipeline connector. In particular, any desired combinations of the previously described design variants can be provided.

REFERENCE LIST

1 Pipeline connector, straight
2 Media pipeline
3 Fastening clip
4 Pipeline connector, angled
5 Encapsulation
7 Assembled media pipeline
8 Pipeline connector
9 Heating element
10 Pipeline connection section
11 Sleeve-shaped, plug-like part
12 External sleeve-shaped part
13 Intermediate space
14 Internal through-opening
15 Coupling section
16 Heat-conducting/thermally conductive sleeve component
17 Sleeve-shaped, plug-like part
18 Overhanging flange-like part
19 Internal through-opening
20 Corrugated pipe
21 Fastening clip
22 Jacket
23 Adhesive tape or fabric adhesive tape
30 Fastening section
40 Heat-conducting/thermally conductive sleeve component
41 Internal through-opening
42 Angled section
43 Plug section
44 Coupling section
45 Centring shoulder
46 Flange-like overhang
47 Coupling section
48 Connection section
49 Groove
50 Air gap
60 Internal thermally conductive part
61 External insulating part
62 Internal through-opening
63 Coupling section
64 Connection region
80 Side-branching connection section
81 Pin
82 Pin
90 First heating strand
91 Second heating strand
92 Third heating strand
93 Connection/crimp point
94 Connection/crimp point
95 Lead
96 Lead
97 Plug
98 Connection/crimp point
100 Groove
142 Groove
146 Overhang
190 End
191 End
192 End
193 End
242 Rib
243 Groove
W Wall thickness
S Pitch
WE Heat coupling region
WT Heat transport region

What is claimed is:

1. An at least partially heatable pipeline connector for a heatable media pipeline, wherein the pipeline connector comprises: a thermally conductive or heat-conducting material, wherein a heating system and/or heating elements are assigned outside of a body of the pipeline connector, wherein the pipeline connector has a through opening for conveyance of a medium through the pipeline connector, wherein the thermally conductive or heat-conductive material is present in a first region of the through opening, wherein a second region of the pipeline connector does not consist of the thermally conductive or heat-conducting material, wherein no heating elements are provided in the body of the pipeline connector, wherein the pipeline connector comprises at least one guide apparatus on an external surface of the pipeline connector for fixing or guiding a heating element on the pipeline connector, wherein the pipeline connector further comprises an insulating apparatus at least partially surrounding the pipeline connector for thermal insulation incorporating at least one air volume for thermal insulation, wherein the thermally conductive material is a thermally conductive plastic, wherein the thermally conductive plastic has a thermal conductivity of 1 to 20 W/(m·K), and wherein the pipeline connector is constructed as one part having multiple permanently connected components including the first region as one component and the second region as a second component.

2. The pipeline connector according to claim 1, wherein the pipeline connector has at least one part constructed as a connection section, in a plug-like manner, wherein the thermally conductive or heat-conducting material is provided at least in a region of the connection section.

3. The pipeline connector according to claim 1, wherein the pipeline connector comprises at least one thermally conductive or heat-conducting sleeve component, which is connected to the same.

4. The pipeline connector according to claim 1, wherein the insulating apparatus is provided in the region of a connecting section for connecting to a plug or the media pipeline.

5. The pipeline connector according to claim 1, wherein the pipeline connector is constructed in such a manner that heat can be coupled into the pipeline connector in a radial direction by an apparatus for heat coupling.

6. The pipeline connector according to claim 1, wherein the pipeline connector is advantageously provided with a wall thickness of 1 to 20 mm for axial thermal transport.

7. The pipeline connector according to claim 1, wherein the pipeline connector is provided with at least one fastening component and/or guide component for an external arrangement of heating elements and for improving an introduction of heat.

8. An assembled media pipeline with at least one heatable media pipeline and with at least one at least partially heatable pipeline connector according to claim 1.

9. The assembled media pipeline according to claim 8, wherein the thermally conductive or heat-conducting material of the pipeline connector is a material which conducts heat better than a material or at least one of the materials of the media pipeline.

10. The assembled media pipeline according to claim 8, wherein the media pipeline is also provided with at least one heating element, extending continuously along the media with at least one heating wire.

11. The assembled media pipeline according to claim 8, wherein the media pipeline comprises at least one layer made up of a conductive or conducting plastic provided with contacting components.

12. The assembled media pipeline according to claim 10 wherein at least one heating strand, is arranged in a region of the pipeline connector.

13. The assembled media pipeline according to claim 12, wherein in a case of a provision of one heating strand, the same extends continuously along the media pipeline and the at least one pipeline connector, in a case of a provision of two heating strands, both extend along the media pipeline and at least one of the two heating strands is provided for wrapping the pipeline connector, in a case of a provision of four heating strands, two heating strands extend along the media pipeline and two heating strands are provided for wrapping the pipeline connectors.

14. The pipeline connector according to claim 1, wherein the thermally conductive plastic has a thermal conductivity of 1 to 7 W/(m·K).

15. The pipeline connector according to claim 6, wherein the pipeline connector is advantageously provided with a wall thickness of 2 to 5 mm for axial thermal transport.

16. The pipeline connector according to claim 3, wherein the pipeline connector is constructed as a two-component injection moulding, insertion part or press-in part and is connected to the sleeve component.

17. The pipeline connector according to claim 4, wherein the insulating apparatus is provided in the region of a fastening clip.

18. The pipeline connector according to claim 1, wherein a connection section connectable to the media pipe is constructed including a laser-transparent material.

19. The pipeline connector according to claim 7, wherein the at least one fastening component and/or guide component has a ribbed structure.

20. The pipeline connector according to claim 11, wherein the layer made up of a conductive or conducting plastic has heating elements for heating a plastic.

21. The pipeline connector according to claim 12, wherein a different number of heating strands are arranged in one region of the pipeline connector as compared to another region of the pipeline connector.

* * * * *